No. 845,982.  
PATENTED MAR. 5, 1907.  
R. S. SMITH.  
FEED BOX.  
APPLICATION FILED DEC. 20, 1906.

WITNESSES:  
E. H. Stewart  
C. Bradway

Robert S. Smith,  
INVENTOR.

By C. A. Snow & Co.  
ATTORNEYS

UNITED STATES PATENT OFFICE.

ROBERT S. SMITH, OF ALVA, OKLAHOMA TERRITORY.

FEED-BOX.

No. 845,982.     Specification of Letters Patent.     Patented March 5, 1907.

Application filed December 20, 1906. Serial No. 348,809.

*To all whom it may concern:*

Be it known that I, ROBERT S. SMITH, a citizen of the United States, residing at Alva, in the county of Woods and Territory of Oklahoma, have invented a new and useful Feed-Box, of which the following is a specification.

This invention has relation to feed-boxes; and it consists in the novel construction and arrangement of its parts, as hereinafter shown and described.

The object of the invention is to provide a box for holding grain-feed and from which the grain is delivered by gravity into a trough in such small quantities that it is impossible for the animal feeding at the box to take excessive mouthfuls of the feed, and consequently choke and waste the feed or bolt the same, which results in indigestion to a greater or less extent.

The box comprises a hopper having an inclined bottom, and at the base of said hopper is located a feeding-trough. A vertically-slidable side is provided at the front of the hopper, and a hinged flap is located at the lower edge of said side. Said flap has limited swing upon its hinge-supports, and consequently as the nose of the animal comes in contact with the said flap the contents of the hopper is gently agitated and the grain will flow down in small quantities under the lower edge of the flap and into the trough. Means is provided for adjusting the space between the lower edge of the flap and the bottom of the trough.

Figure 1:
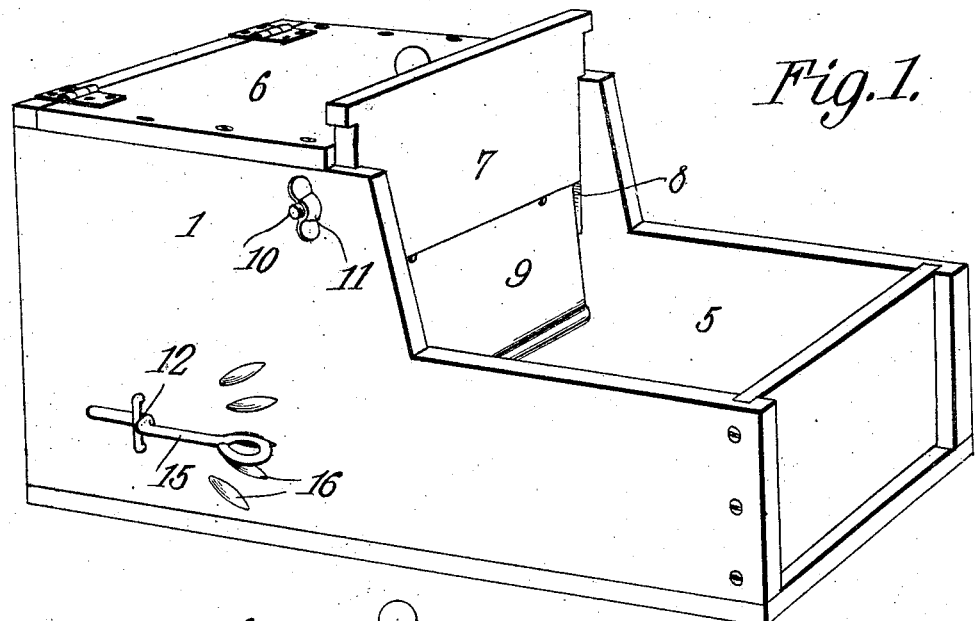
Figure 2:
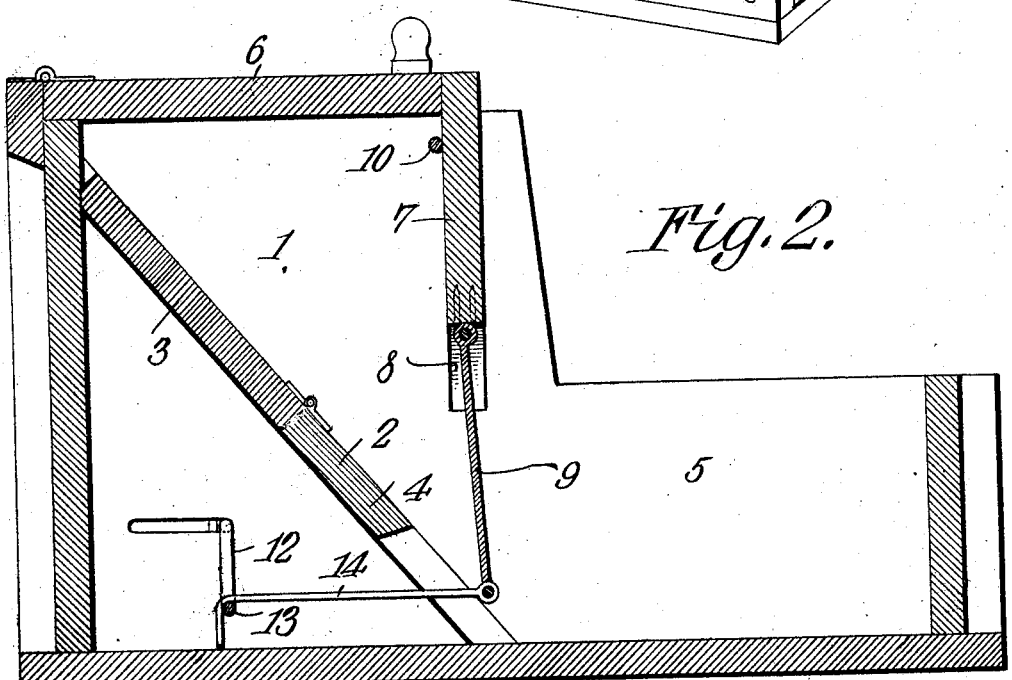

In the accompanying drawing, Figure 1 is a perspective view of the feed-box, and Fig. 2 is a longitudinal sectional view of the same.

The box comprises the hopper 1, which is provided with an inclined bottom 2, the upper portion 3 of which is hinged to the lower fixed portion 4 thereof. The trough 5 is located at the base of the hopper 1. The hopper 1 is closed by the hinged cover 6. The front of the hopper is provided with a vertically-adjustable side 7, said side having its vertical edges seated in the grooves 8, located in the lateral sides of the hopper 1. The flap 9 is hinged to the lower edge of the side 7 and is permitted to have a limited swinging movement upon its hinge-supports. The cross-rod 10 extends transversely through the lateral sides of the hopper 1 and is provided at one end with a wing-nut 11, which when tightened up holds the lateral sides of the hopper 1 in close contact with the edges of the side 7, and thus the parts are positively held together. The shaft 12 is journaled in the lateral sides of the hopper 1 and is provided at a point under the bottom 2 with a crank 13, which engages the link 14. The forward end of said link 14 is connected with the flap 9. The outer end of the lever 12 is provided with a crank-handle 15, which is adapted to spring laterally in any one of the detents 16, provided upon the sides of the box.

The feed is deposited in the hopper 1 and is held by gravity against the flap 9, which will be pushed out under the weight of the feed. Consequently some of the feed will pass below the edge of the flap 9 into the trough 5. This feed will be acceptable for the animal, and as the animal brings its nose in contact with the said flap the feed is generally agitated and flows in limited quantities into the trough 5. By turning the crank 15 the shaft 12 and crank 13 are moved, whereby the flap 9 may have a greater or less swing, according to the distance between the lower end of the crank 13 and the lower edge of said flap when the flap is vertical. The outward swing of the flap is limited by the rod 14.

Having described my invention, what I claim as new, and desire to secure by Letters Patent, is—

1. A feed-box comprising a hopper having an inclined bottom, said hopper having a vertically-adjustable side, a flap hinged to the lower edge of the said adjustable side and means for limiting the swinging movement of the flap.

2. A feed-box comprising a hopper having an inclined bottom and a vertically-adjustable side, a flap hinged to the lower edge of said adjustable side and having limited swinging movement, a means for regulating the extent of such swinging movement.

3. A feed-box comprising a hopper having an inclined bottom and a vertically-adjustable side, a flap hinged to the lower edge of said bottom, a shaft journaled in the sides of the box and having an exteriorly-located handle and a link connecting said shaft with said flap.

4. A feed-box comprising a hopper having an inclined bottom composed of sections hinged together, a hinged flap supported opposite said inclined bottom and having limited swinging movement and means for regulating the extent of the swing of the flap, said means being housed in the space below the inclined bottom of the hopper.

In testimony that I claim the foregoing as my own I have hereto affixed my signature in the presence of two witnesses.

ROBERT S. SMITH.

Witnesses:
N. A. BLEAKLY,
HARRY E. MASON.